United States Patent [19]

Lee et al.

[11] Patent Number: 5,516,881

[45] Date of Patent: May 14, 1996

[54] AMINOXYL-CONTAINING RADICAL SPIN LABELING IN POLYMERS AND COPOLYMERS

[75] Inventors: Keun-Ho Lee; Chih-Chang Chu; Jack H. Freed, all of Ithaca, N.Y.

[73] Assignee: Cornell Research Foundation, Inc., Ithaca, N.Y.

[21] Appl. No.: 288,601

[22] Filed: Aug. 10, 1994

[51] Int. Cl.⁶ .................................................. C08G 73/10
[52] U.S. Cl. ..................... 528/320; 528/310; 528/335; 528/354; 528/361; 424/1.11; 424/1.29; 424/1.33; 424/1.81; 424/78.08; 424/78.14; 424/78.27; 424/78.29
[58] Field of Search .................................. 424/1.11, 1.29, 424/1.33, 1.81, 78.08, 78.14, 78.27, 78.29; 528/310, 320, 335, 354, 361

[56] References Cited

U.S. PATENT DOCUMENTS 4,999,417 3/1991 Domb ........................................ 528/271

OTHER PUBLICATIONS

Wee, E. L., et al, J. Phys. Chem. 77, 182–189 (1973).
Luoma, G. A., et al, Biochemistry 24, 6591–6598 (1982).
Voronina, S. S., et al, USSR Academy of Science News, 723–730, May 1972.
Bioactive Spin Labels, Zhdanov, R. I., ed., Springer-Verlag, pp. 429–489, New York, 1992.
Snyder, S. H., et al, Scientific American, 68–72, May 1992.
Handbook of Fluorescent Probes and Research Chemicals, 5th edition, by Haugland, R. P.,; K. D. Larison, editor; pp. 1, 2 and 154, Molecular Probes, Inc., Oregon, 1992.
Emmerson, P. T., et al, Nature, 1005–1006, Dec. 5, 1964.
Klimek, M., Nature, 1256–1257, Mar. 19, 1966.
Feldman, P. L., et al, C & EN, 26–38, Dec. 20, 1993.

Primary Examiner—Shelley A. Dodson
Assistant Examiner—P. Hampton-Hightower

[57] ABSTRACT

Aminoxyl-containing radical is provided in polymers and copolymers by replacing a hydroxyl moiety in a carboxyl group at a chain end of a starting material biodegradable polymer or copolymer with imino or oxy linked to aminoxyl-containing radical to form an amide linkage or an oxycarbonyl linkage at the chain end of biocompatible polymers or copolymers to the aminoxyl-containing radical. Preferred starting material polymers and copolymers are prepared from the hydroxy alkyl carboxylic acid monomers glycolic acid and lactic acid. Preferred aminoxyl-containing radical is 2,2,6,6-tetramethylpiperidine-1-oxy. Product polymers are useful for aminoxyl-containing radical treatment of tumors, and to increase the efficiency of chemotherapy and ionizing radiation therapy of tumors and for the reconstruction of injured, diseased, or aged human blood vessels.

16 Claims, 5 Drawing Sheets

AMINOXYL-CONTAINING RADICAL SPIN LABELING IN POLYMERS AND COPOLYMERS

TECHNICAL FIELD

This invention is directed to providing biocompatible polymers and copolymers which contain aminoxyl-containing radicals.

BACKGROUND OF THE INVENTION

The antitumor capability of aminoxyl radicals (sometimes referred to as nitroxyl radicals) has been demonstrated by many investigators. One recent publication that provides a review of the role of these radicals in cancer chemotherapy is Zhdanov, R. I., (editor), Bioactive Spin Labels, pages 429–460, Springer-Verlag, New York, 1992.

There have been many attempts to deliver these radicals for anticancer purposes. In one method, low molecular weight compounds have been used to administer these radicals without coadministration of conventional anticancer agents. In another method, conventional anticancer agents modified to contain aminoxyl-containing radicals have been utilized. Neither of these approaches has as yet found acceptance.

Turning now to another area, low molecular weight compounds containing aminoxyl-containing radicals have been utilized to sensitize cells including tumor cells to the effects of ionizing radiation, thereby increasing the efficiency and result of the radiation therapy. This method has not yet found acceptance.

Turning now to still another area, the major obstacle to using existing synthetic biomaterials for the reconstruction of injured, diseased or aged blood vessels is the formation of blood clots on these synthetic biomaterials after implantation, causing plugging of the artificial vessels and rendering them useless. Thus, there is a need for synthetic materials for blood vessel reconstruction which reduce the probability of blood clot formation.

SUMMARY OF THE INVENTION

The concept herein is to provide a biocompatible polymer or copolymer which contains an aminoxyl-containing radical and which preferably is biodegradable. As indicated in more detail later, a solid biodegradable polymer or copolymer which contains an aminoxyl-containing radical can be fixed in place in a solid tumor for biological reaction of aminoxyl-containing radical at the polymer surface to provide initial effect followed by biodegradation, e.g., by hydrolysis of polymer moiety to release aminoxyl-containing radical from inside the modified polymer mass, for antitumor effect by the aminoxyl-containing radical on its own or to mediate the effect of other chemotherapy or radiation therapy. A liquid biodegradable polymer or copolymer herein can be injected into the bloodstream for treatment of ascitic tumors and leukemia. The utility of polymer or copolymer herein for antitumor purposes is not limited by the ability to form appropriate analog of conventional drug or to deliver that analog appropriately and is independent of macrophage activation. Furthermore, as is indicated in more detail later, biodegradable and non-biodegradable solid polymeric or copolymeric biomaterial herein on use for reconstruction of blood vessels prevents platelet aggregation and thus is suitable for providing temporary blood vessel structure to give the body time to regenerate replacement structure on its own, while reducing the probability of blood clot formation and blockage of the artificial structure.

The concept described above is applied by the provision of a polymer or copolymer containing a chain end provided by an amide linkage or an oxycarbonyl linkage to an aminoxyl-containing radical, preferably by an amide linkage to the 4-position of 2,2,6,6-tetramethylpiperidine-1-oxy.

The term "aminoxyl" is used herein to refer to the structure $>$N—O•. The term "aminoxyl-containing radical" is used herein to refer to a radical that contains the structure $>$N—O•.

The term "biocompatible" is used herein to mean material that interacts with the body without undesirable aftereffects.

The term "biomaterial" is used herein to mean a material which has properties which are adequate for human body reconstruction and/or drug control/release devices.

The term "biodegradable" is used herein to mean capable of being broken down into innocuous products in the normal functioning of the body.

DETAILED DESCRIPTION

The polymers and copolymers herein have the formula:

(1)

or

(2)

The —R— between the parentheses stands for polymer or copolymer moiety. The —C(=O)—NH— moiety is the amide linkage and the —C(=O)— O— moiety is the oxycarbonyl linkage. Q is the aminoxyl-containing moiety.

The biodegradable polymers and copolymers herein can be solids or liquids. The non-biodegradable polymers and copolymers herein are solids.

The polymers or copolymers herein can be formed by replacing a hydroxyl moiety in the carboxyl group chain end of a starting material polymer or copolymer which is carboxyl group chain terminated (i.e., the starting material polymer or copolymer has a backbone which ends in a carboxyl group) with —NH—Q or with —O—Q.

The biodegradable polymers and copolymers herein are characterized as biodegradable because they contain polymer or copolymer moiety in the formulas set forth above which is biodegradable. The starting material polymers and copolymers for providing said biodegradable polymer or copolymer moiety are biodegradable polymers and copolymers which contain hydrolyzable ester linkages or hydrolyzable nitrogen-phosphorus linkages, i.e., which provide the biodegradability, and which are carboxyl group chain terminated. Said biodegradable polymer or copolymer moiety is the moiety provided by the biodegradable starting material polymers and copolymers with the terminal carboxyl group removed.

The non-biodegradable polymers and copolymers herein contain polymer or copolymer moiety in the formulas set forth above which is not biodegradable. The starting material polymers and copolymers for providing these polymer or copolymer moieties are carboxyl group chain terminated but do not contain hydrolyzable linkages and hence are not biodegradable. The polymer or copolymer moiety is the moiety provided by the starting material polymer or copolymer with the terminal carboxyl group removed.

The starting material biodegradable polymers and copolymers for providing the biodegradable polymers and copolymers herein include (1) biodegradable linear aliphatic homopolymer and copolymer polyesters; (2) biodegradable copolymers formed by copolymerizing (a) monomers which polymerize to form linear aliphatic polyesters with (b) monomers which do not polymerize to form linear aliphatic polyesters, or formed to be block copolymers of (a) and (b); and (3) biodegradable polymers and copolymers other than (1) and (2).

The weight average molecular weights of these starting material biodegradable polymers and copolymers typically range from 10,000 to 500,000, preferably from 20,000 to 125,000.

Examples of biodegradable linear aliphatic homopolymer polyesters include poly(alpha-hydroxy $C_1$–$C_5$ alkyl carboxylic acids), e.g., polyglycolic acids, poly-L-lactides, and poly-D,L-lactides; poly-3-hydroxy butyrate; polyhydroxyvalerate; polycaprolactones, e.g., poly(epsilon-caprolactone); and modified poly(alpha-hydroxyacid)homopolymers, e.g., homopolymers of the cyclic diestermonomer, 3-(S)[alkyloxycarbonyl)methyl]-1,4-dioxane- 2,5-dione which has the formula 4 where R is lower alkyl, depicted in Kimura, Y., "Biocompatible Polymers" in Biomedical Applications of Polymeric Materials, Tsuruta, T., et al, eds., CRC Press, 1993 at page 179. The invention herein excludes starting material poly-L-glutamates and polymer moieties obtained therefrom as spin labeled poly-L-glutamates are known in the prior art.

Examples of biodegradable linear aliphatic copolymer polyesters are glycolide-lactide copolymers, glycolide-caprolactone copolymers, poly-3-hydroxy butyrate-valerate copolymers, and copolymers of said cyclic diester monomer, 3-(S)[ (alkyloxycarbonyl)methyl]-1,4-dioxane-2,5-dione, with L-lactide. The glycolide-lactide copolymers include poly(glycolide-L-lactide) copolymers formed utilizing a monomer mole ratio of glycolic acid to L-lactic acid ranging from 5:95 to 95:5 and preferably a monomer mole ratio of glycolic acid to L-lactic acid ranging from 45:65 to 95:5, e.g., a monomer mole ratio of glycolic acid to L-lactic acid of 90:10 or a monomer mole ratio of glycolic acid to L-lactic acid of 50:50. The glycolide-caprolactone copolymers include glycolide and epsilon-caprolactone block copolymer, e.g., Monocryl or Poliglecaprone.

Examples of biodegradable copolymers formed by copolymerizing (a) monomers which polymerize to form linear aliphatic polyesters with (b) monomers which do not polymerize to form linear aliphatic polyesters or formed to be block copolymers of (a) and (b) include poly(L-lactic acid-L-lysine) as described in Barrera, D. A., et al, JACS, Vol. 115, pp. 11010 to 11011 (1993); tyrosine based polyarylates, tyrosine-based polyiminocarbonates and tyrosine-based polycarbonates as described in Kohn, J., The 20th Annual Meeting of the Society of Biomaterials Apr. 5–9, 1994 publication, page 67 and in Nathan, A., et al, "Amino Acid Derived Polymers" in Biomedical Polymers, edited by Shalaby, S. W., pages 128, 129, Hauser Publishers, New York, 1994; poly(D,L-lactide-urethanes) as described in Storey, R. F., et al, ANTEC '92, 734–737 (1992); poly(ester-amides) as described in Barrows, T. H., "Bioabsorable Poly(ester-amides)" in Biomedical Polymers, edited by Shalaby, S. W., pages 100–101, Hauser Publishers, New York, 1994; and glycolide and trimethylene carbonate block copolymer, e.g., Maxon.

Examples of other starting material biodegradable polymers and copolymers include poly[bis(carboxylatophenoxy)phosphazene] as described in Cohen S., JACS, 112, 7832–7833 (1990); polyanhydrides, e.g., polymaleic anhydride, polysuccinic anhydride and polyglutaric anhydride; polycyanoacrylates, e.g., poly(alkyl-alphacyanoacrylate); and poly-p-dioxanone, e.g., PDS-II.

The biodegradable polymer and copolymer poly(alpha-hydroxy-$C_1$–$C_5$ carboxylic acids) preferably have weight average molecular weights ranging from 10,000 to 125,000; these polymers and copolymers typically have inherent viscosities at 25° C., determined by standard viscosimetric methods, ranging from 0.3 to 4.0, preferably ranging from 0.5 to 3.5.

The starting material polymers and copolymers for providing the non-biodegradable polymers herein are polyalkylene terephthalates wherein the alkylene contains 2 to 4 carbon atoms, e.g., polyethylene terephthalate, e.g., Dacron®, and polybutylene terephthalate, having a weight average molecular weight ranging from about 20,000 to about 100,000.

We turn now to Q in the formulas for the polymers and copolymers herein, i.e, the aminoxyl-containing radical. This can be any aminoxyl-containing radical that is derived from a spin label that is reacted with terminal carboxyl of the starting material polymer to replace hydroxy in said terminal carboxyl with imino linked to Q or with oxy linked to Q. Qs from commercially available spin label include 2,2,6,6-tetramethylpiperidine-1-oxy which is bonded at its 4-position to the amide linkage in the formula (1) for the polymers and copolymers herein, i.e., and 2,2,5,5-tetramethylpyrrolidine-1-oxy which is bonded at its 3-position to the amide linkage in the formula (1) for the polymers and copolymers herein, i.e., and 2,2,5,5-tetramethyl-3-pyrroline-1-oxy-3-carbonyl where the carbonyl is bonded to the oxycarbonyl linkage in the formula (2) for the polymers and copolymers herein, i.e., The spin labels that are reacted with terminal carboxyl of the starting material polymer or copolymer to replace hydroxy in said terminal carboxyl with imino linked to the 4-position of 2,2,6,6 -tetramethylpiperidine-1-oxy include 4-amino-2,2,6,6 -tetramethylpiperidine-1-oxy (TEMPAMINE); 4-(N,N-dimethyl-N-hexadecyl)ammonium- 2,2,6,6-tetramethylpiperidine-1-oxy, iodide (CAT16); 4-(N,N-dimethyl-N-(2-hydroxyethyl))ammonium-2,2,6,6 -tetramethylpiperidine-1-oxy(TEMPO choline); 4-(N,N-dimethyl-N-(3 -sulfopropyl)ammonium-2,2,6,6-tetramethylpiperidine-1-oxy; N-(4 -(iodoacetyl)amino-2,2,6,6-tetramethylpiperidine-1-oxy(TEMPO 1A); N-( 2,2,6,6-tetramethylpiperidine-1-oxy-4-yl)maleimide(TEMPO maleimide, MAL-6); and 4-trimethylammonium-2,2,6,6 -tetramethylpiperidine-1-oxy, iodide (CAT 1).

Spin labels that are reacted with terminal carboxyl of the starting material polymer or copolymer to replace hydroxy in said terminal carboxyl with imino linked to the 3-position of 2,2,5,5 -tetramethylpyrrolidine-1-oxy include 3-amino-2, 2,5,5 -tetramethylpyrrolidine-1-oxy; and N-(3-(iodoacetyl)amino)-2,2,5,5 -tetramethylpyrrolidine-1-oxy(PROXYL 1A).

Spin labels that are reacted with terminal carboxyl of the starting material polymer or copolymer to replace hydroxy in said terminal carboxyl with oxy linked to the carbonyl of 2,2,5,5 -tetramethyl-3-pyrroline-1-oxy-3-carbonyl include succinimidyl 2,2,5,5-tetramethyl-3-pyrroline-1-oxy-3-carboxylate and 2,2,5,5 -tetramethyl-3-pyrroline-1-oxy-3-carboxylic acid.

Polymers and copolymers of the invention herein of the formula (1) can be prepared from the starting material polymers and copolymers by reacting starting material polymer or copolymer with amine or ammonium containing spin label, e.g., 4-amino-2,2,6,6 -tetramethylpiperidine-1-oxy, in the presence of N,N'-carbonyl diimidazole to replace hydroxyl moiety in the carboxyl group at the chain end of the starting material polymer or copolymer with imino linked to aminoxyl-containing radical, e.g., 4-imino-2,2,6,6 -tetramethylpiperidine-1-oxy, so that the imino moiety covalently bonds to the carbon of the carbonyl residue of said carboxyl group. The N,N'-carbonyl diimidazole converts the hydroxyl moiety in the carboxyl group at the chain end of the starting material polymer or copolymer into an intermediate product moiety which will react with the spin label, e.g., 4-amino-2,2,6,6-tetramethylpiperidine-1-oxy. The spin labels specifically recited herein and the N,N'-carbonyl diimidazole are commercially available. Many suitable starting material polymers or copolymers are commercially available. The spin label reactant, e.g., 4-amino-2,2,6,6-tetramethyl-piperidine-1-oxy reactant, is typically used in a mole ratio of reactant to starting material polymer or copolymer ranging from 1:1 to 100:1. The mole ratio of N,N'-carbonyl diimidazole to spin label, e.g., 4 -amino-2,2, 6,6-tetramethylpiperidine-1-oxy, is preferably about 1:1.

For the reaction described in the above paragraph (hereinafter said reaction), the polymer or copolymer starting material is dissolved in a reaction solvent and reaction is readily carried out at the temperature utilized for the dissolving. The reaction solvent may be any in which the starting material polymer or copolymer Will dissolve; this information is normally available from the manufacturer of the polymer or copolymer. Where the starting material polymer or copolymer is a polyglycolic acid or a poly(glycolide-L-lactide) where the monomer mole ratio of glycolic acid to L-lactic acid is greater than 50:50, highly refined (99.9+% pure) dimethyl sulfoxide at 115° to 130° C. or hexafluoroisopropanol at room temperature suitably dissolves the starting material polymer or copolymer. Where the starting material polymer or copolymer is a poly-L-lactic acid, a poly-DL-lactic acid or a poly(glycolide-L-lactide) where the monomer mole ratio of glycolic acid to L-lactic acid is 50:50 or less than 50:50, tetrahydrofuran, methylene chloride and chloroform at room temperature to 50° C. suitably dissolve the starting material polymer or copolymer.

Said reaction is typically carried out to substantial completion in 30 minutes to 5 hours. For said reaction where a polyglycolic acid or a poly(glycolide-L-lactide) from a glycol-rich monomer mixture constitutes the starting material polymer or copolymer, 2 to 3 hours of reaction time is preferred. For said reaction where a poly-L-lactic acid is the starting material polymer or copolymer, the reaction is readily carried out to substantial completion at room temperature for one hour.

Said reaction is preferably carried out with dry inert gas, e.g., dry nitrogen purging to remove water by-product to drive the reaction to completion.

The product may be precipitated from the reaction mixture by adding cold non-solvent for the product. For example, aminoxyl-containing radical modified polyglycolic acid and aminoxyl-containing radical modified poly(glycolide-L-lactide) formed from glycolic acid-rich monomer mixture are readily precipitated from hot dimethylsulfoxide by adding cold methanol or cold acetone/methanol mixture and then recovered, e.g., by filtering. Where the product is not readily precipitated by adding cold nonsolvent for the product, the product and solvent may be separated by using vacuum. For example, aminoxyl-containing radical modified poly-L-lactic acid is advantageously separated from solvent in this way. The recovered product is readily further purified by washing with solvent for water and by products (e.g., urea) which does not dissolve product, e.g., methanol in the case of the modified polyglycolic acid, polylactic acid and poly(glycolide-L-lactide) products herein, and residual solvent from such washing may be removed using vacuum drying.

Polymers and copolymers of the invention herein of the formula (2) can be prepared from the starting material polymers and copolymers by reacting starting material polymer or copolymer with oxycarbonyl containing spin label, e.g., succinimidyl 2,2,5,5 -tetramethyl-3-pyrroline-1-oxy-3-carboxylate or 2,2,5,5-tetramethyl- 3-pyrroline-1-oxy-3-carboxylic acid, in the presence of 1,3-dicyclo hexyl-carbodiimide to replace hydroxyl moiety in the carboxyl group at the chain end of the starting material polymer or copolymer with oxycarbonyl linked to aminoxyl-containing radical, e.g., 2,2,5,5 -tetramethyl-3-pyrroline-1-oxy-3-carbonyl, so that the oxycarbonyl moiety bonds to the carbon of the carbonyl residue of said carboxyl group. The spin labels specifically recited herein and the 1,3-dicyclo hexyl-carbodiimide are commercially available. As indicated above, many starting material polymers and copolymers are commercially available.

The unpaired electron of the aminoxyl-containing radical of the polymers and copolymers of the invention herein is paramagnetic and therefore generates an electron spin resonance signal. As a result, the polymers and copolymers of the invention provide distinctive electron spin resonance spectra. Such spectra are shown in FIGS. 1–5 which are the electron spin resonance spectra respectively for the compounds of Examples I–V. The spectra of FIGS. 1–5 show intensity peaks at 3360–3375 gauss and 3390–3400 gauss with an intervening valley at 3375–3390 gauss with the second peak being followed by valleys at 3395–3410 gauss and at 3430–3440 gauss. Such electron spin resonance spectra show that substitution of aminoxyl-containing radical into the starting material polymer or copolymer has occurred.

For antitumor treatment for solid tumors, solid biodegradable polymers and copolymers herein are preferably implanted into the tumor being treated, e.g., by implanting the polymers or copolymers in pellet form or by utilizing the polymers and copolymers, e.g., in fiber form (e.g., formed into thread by melt spinning) to suture the tumor, to thereby fix the polymer or copolymer in place in the tumor, i.e., at the site requiring treatment. For antitumor treatment for ascitic tumors and leukemia, the polymers and copolymers used are in liquid form and are administered parenterally, preferably intravenously. When utilized to mediate the effect of other anticancer drug, e.g., a thiophosphamide, a diethyleneimide of urethane phosphorus acid, 5-fluorouracil, rubomycin, actinomycin D, or sarcolysin, the biodegradable polymers and copolymers herein can be used in a 1:1 molar ratio with the other anticancer drug, with the other anticancer drug being administered in its conventional dosage via its conventional administration route. When used per se or to mediate the effect of radiation therapy, it can be used in a dosage to provide a significant volume of polymer compared to the volume of the tumor.

For blood vessel reconstruction, biodegradable or non-biodegradable aminoxyl-containing radical modified polymer or copolymer herein is derived from starting material polymer or copolymer biomaterial including starting material polymers or copolymers originally prepared for biomaterial use as well as those that are suitable for such use although not specifically prepared to be biomaterials. The aminoxyl-containing radical modified polymers and copolymers can be spun into fibers which are subsequently used for vascular grafts which provide temporary structure to give the body time to regenerate replacement structure on its own. The aminoxyl-containing radical moiety reduces the probability of blood clot formation and blockage of the artificial structure. The platelet aggregation inhibiting properties of aminoxyl-containing radicals are described in Zhdanov, R. I., (editor), Bioactive Spin Labels, pp. 461–488, Springer-Verlag, New York, 1992 and in Snyder, S. H., et al, Scientific American, p. 68, May, 1992. In place in blood vessel reconstruction, surgical implants made of the polymers and copolymers herein also decrease inflammatory response by neutralizing oxidative stress. The nonbiodegradable polymers and copolymers herein are removed from the body once replacement structure is regenerated. The biodegradable polymers and copolymers degrade in the body over time and these do not require removal.

The polymers and copolymers of the invention herein are also useful in detoxifying devices to trap heavy metals.

The invention is illustrated in the following examples. In each of the examples, the polymer or copolymer starting material contained a chain-terminating carboxyl group.

Example I

Figure 1:
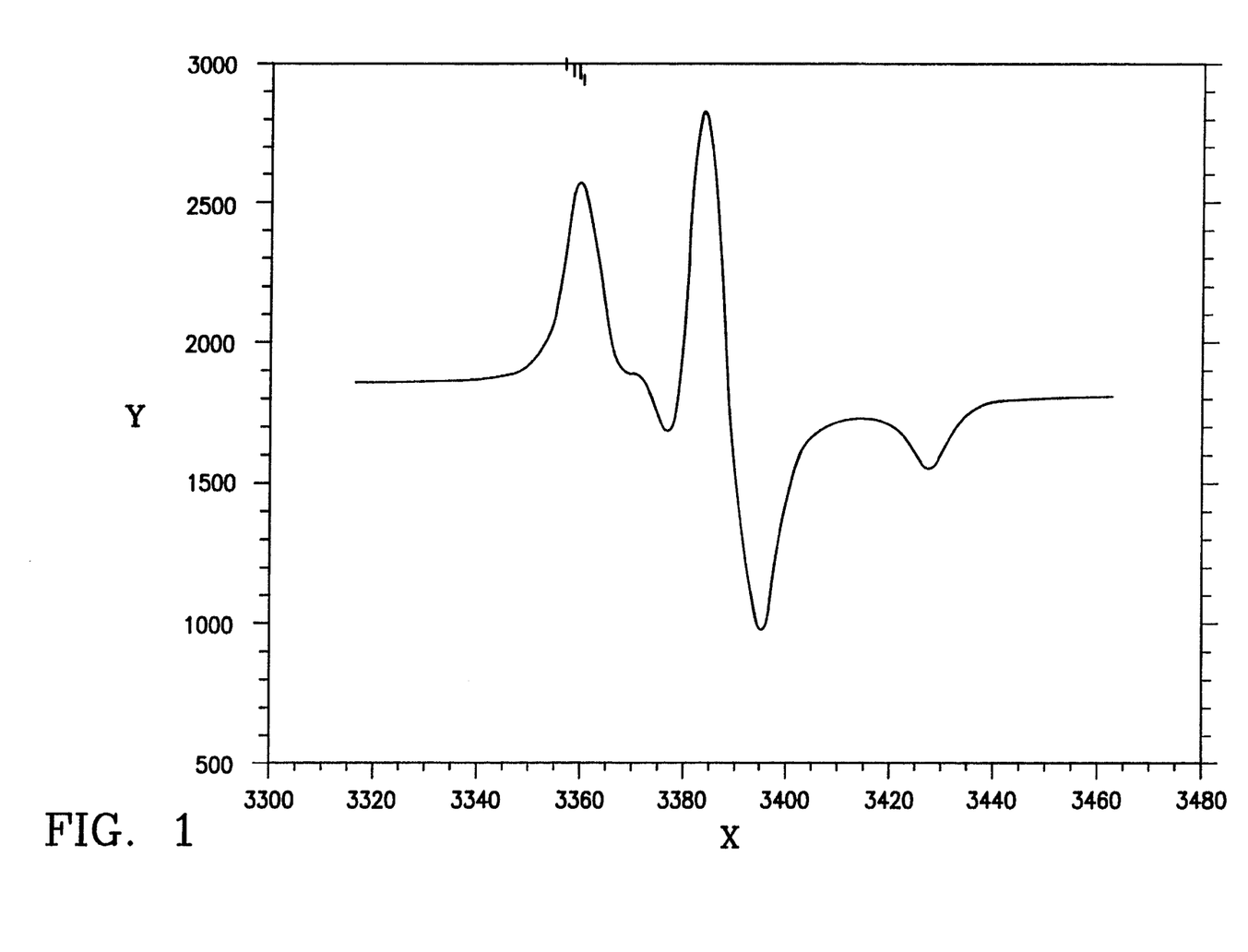
FIGS. 1–5 are graphs showing results of electron spin resonance spectra for the compounds respectively of Examples I–V, wherein X stands for external magnetic field in gauss and Y stands for signal intensity (in arbitrary units).

Polyglycolic acid, 0.5 g (0.005 mmol), having an inherent viscosity of about 1.3 as determined at 25° C. by a standard viscometric method, from Boehringer (Ingelheim, Germany), was dissolved in 50 ml distilled dimethylsulfoxide at 120°–130° C. Then N,N'-carbonyl diimidazole (8.1 mg) was added. After 15 minutes, 4 -amino-2,2,6,6-tetramethyl-piperidine-1-oxy (8.5 mg., $5\times10^{-5}$ mole) was added. The reaction mixture was then vigorously stirred for 2 hours while maintaining a temperature of 125° C. and reflux condenser purging with dry nitrogen gas. The resulting solution was poured into a mixture of cold (4° C.) acetone and methanol (60/40 volume ratio) resulting in the precipitation of polyglycolic acid polymer moiety (i.e., without chain terminating carboxyl) linked by an amide linkage to the 4-position of 2,2,6,6-tetramethylpiperidine-1-oxy. Impure polymer product was recovered by filtering and was purified by washing three times with methanol and then vacuum drying overnight. Electron spin resonance spectroscopy analysis results on the product are shown in FIG. 1. These results demonstrate obtaining of the named product.

Example II

Figure 2:
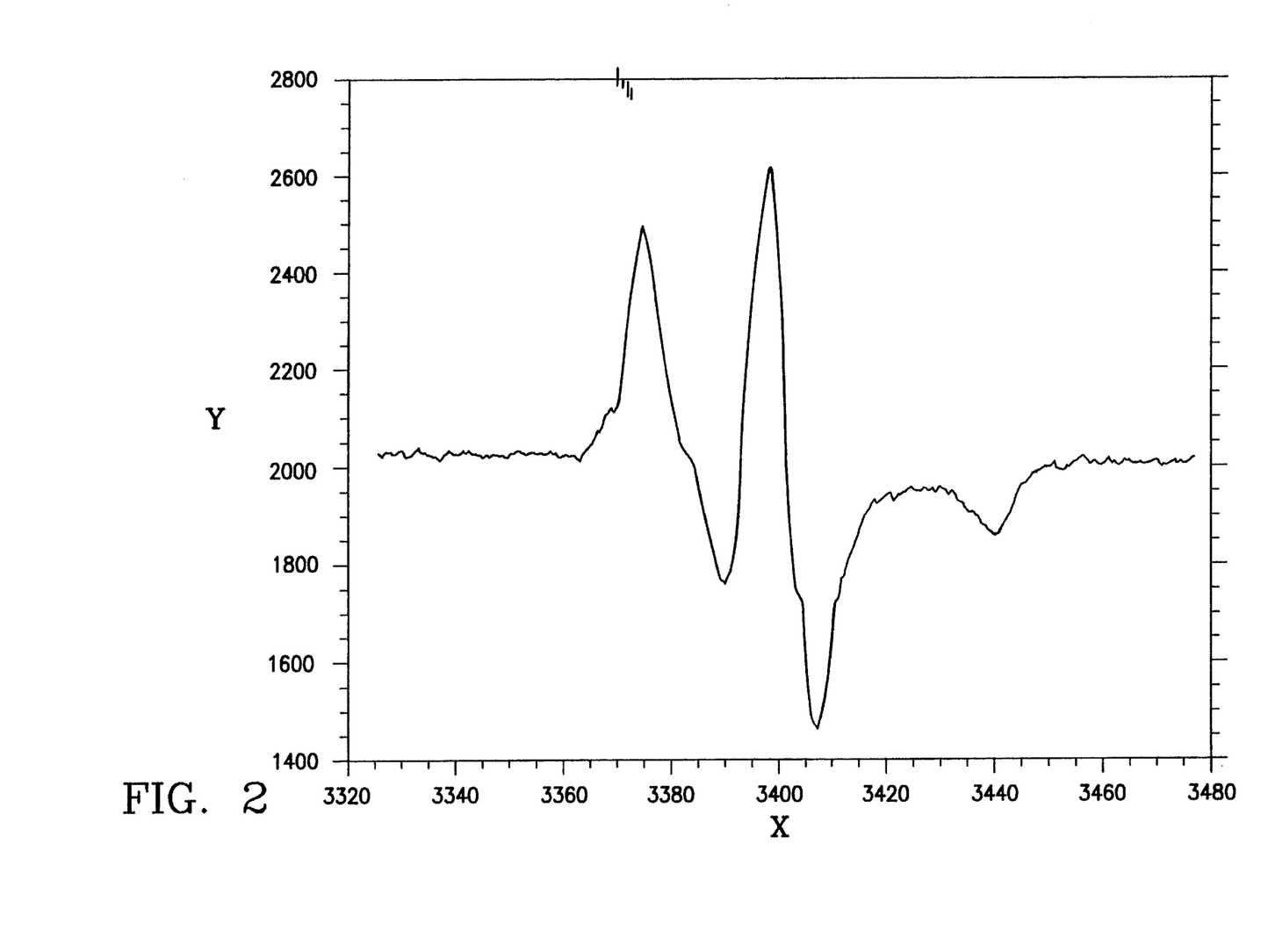

Poly-L-lactic acid, 5 g (0.03 nmol) having an inherent viscosity of about 2.9 as determined at 25° C. by a standard viscometric method, from Boehringer (Ingelheim, Germany), was dissolved in 100 ml distilled chloroform at 40° C. Then N,N'-carbonyl diimidazole (15 mg) was added. After 15 minutes, 4-amino- 2,2,6,6-tetramethylpiperidine-1-oxy (15.4 mg) was added. The reaction mixture was then stirred for 3 hours while maintaining a temperature of 40° C. and reflux condenser purging with dry nitrogen gas. The resulting solution was then poured into cold (4° C.) methanol to precipitate impure poly-L-lactic acid moiety (i.e., without chain terminating carboxyl) linked by an amide linkage to the 4-position of 2,2,6,6-tetramethylpiperidine-1-oxy. The polymer product was recovered by filtering and purified by washing three times with methanol and then vacuum drying overnight. Electron spin resonance spectroscopy analysis results on the product are shown in FIG. 2 and demonstrate obtaining of the named product.

Example III

Figure 3:
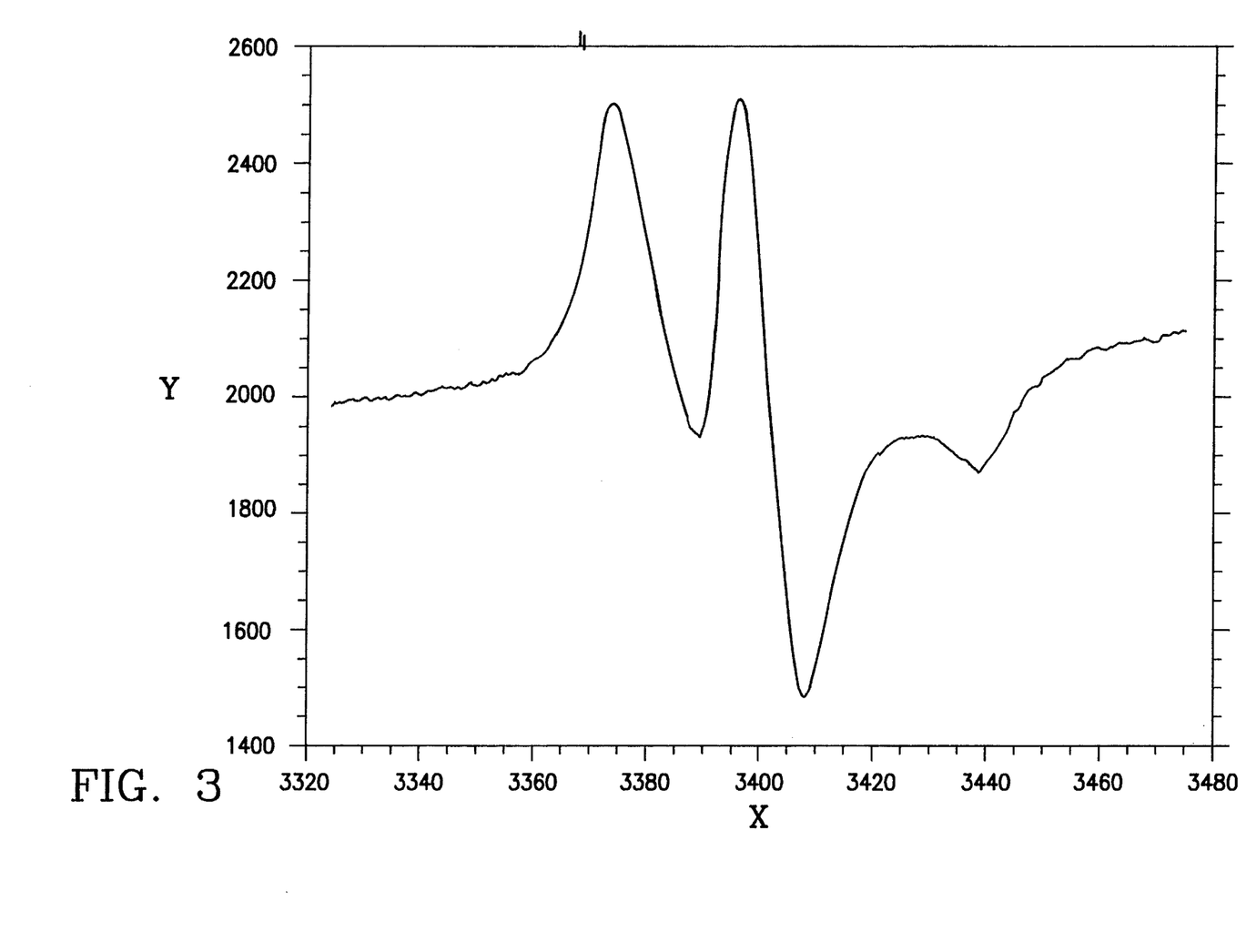

Poly-DL-lactic acid (0.5 g) having an inherent viscosity of about 0.7 as determined at 25° C. by a standard viscometric method, and a weight average molecular weight of about 110,000, obtained from DuPont Chemical Company, was dissolved in 10 ml distilled tetrahydrofuran at 45° C. Then N,N'-carbonyl diimidazole (8 mg) was added. After 20 minutes, 4-amino-2,2,6,6-tetramethyl-piperidine-1-oxy (8.5 mg) was added. The reaction mixture was then stirred for 3 hours while maintaining a temperature of 48° C. and reflux condenser purging with dry nitrogen gas. The resulting solution was evaporated using a rotor vaporizer to leave a residue of impure poly-DL-lactic acid moiety (i.e., without the chain terminating carboxyl) linked by an amide linkage to the 4-position of 2,2,6,6 -tetramethylpiperidine-1-oxy. The impure polymer product was purified by washing 3 times with methanol and then vacuum drying overnight. Electron spin resonance spectroscopy analysis results on the product are shown in FIG. 3 and demonstrate obtaining of the named product.

Example IV

Figure 4:
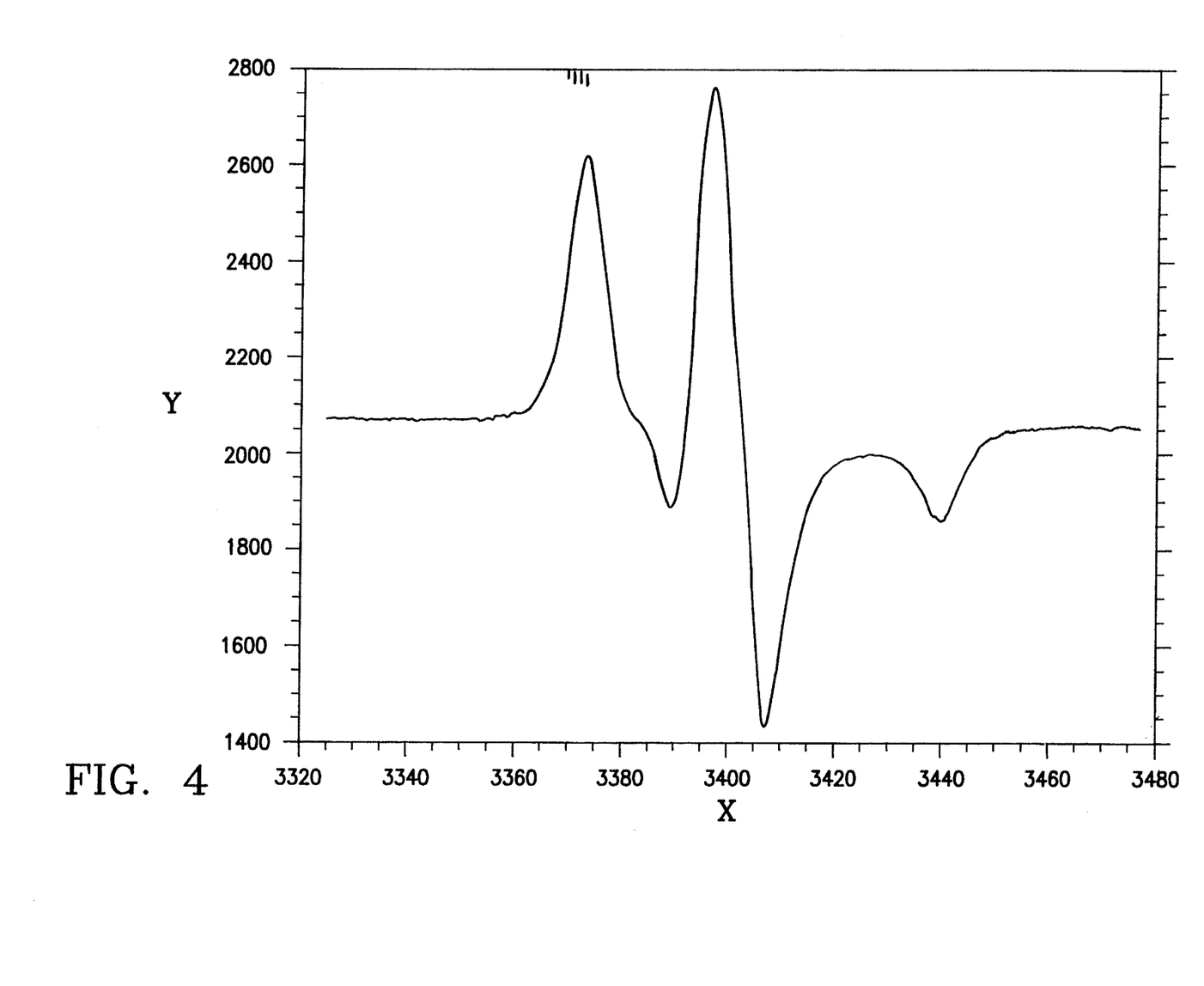

Poly(glycolide-L-lactide) copolymer (90:10 glycolic acid:L-lactic acid monomer ratio), 0.5 g, having an inherent viscosity of about 1.0, as determined at 25° C. by a standard viscometric method, from Boehringer (Ingelheim, Germany), was dissolved in 50 ml distilled dimethylsulfoxide at 120°–130° C. Then N,N'-carbonyl diimidazole (8.1 mg) was added. After 15 minutes, 4-amino-2,2,6,6 -tetramethylpiperidine-1-oxy (8.5 mg) was added. The reaction mixture was then vigorously stirred for 2 hours while maintaining a temperature of 125° C. and reflux condenser purging with dry nitrogen gas. The resulting solution was poured into a mixture of cold (4° C.) acetone and methanol (60/40 volume ratio) resulting in the precipitation of poly(glycolide-L-lactide) copolymer (90:10 glycolic acid:L-lactic acid monomer ratio) moiety (i.e., without chain terminating carboxyl)

linked by an amide linkage to the 4-position of 2,2,6,6-tetramethylpiperidine-1-oxy. Impure copolymer product was recovered by filtering and was purified by washing three times with methanol and then vacuum drying overnight. Electron spin resonance spectroscopy analysis results on the product are shown in FIG. 4 and demonstrate obtaining of the named product.

Example V

Figure 5:
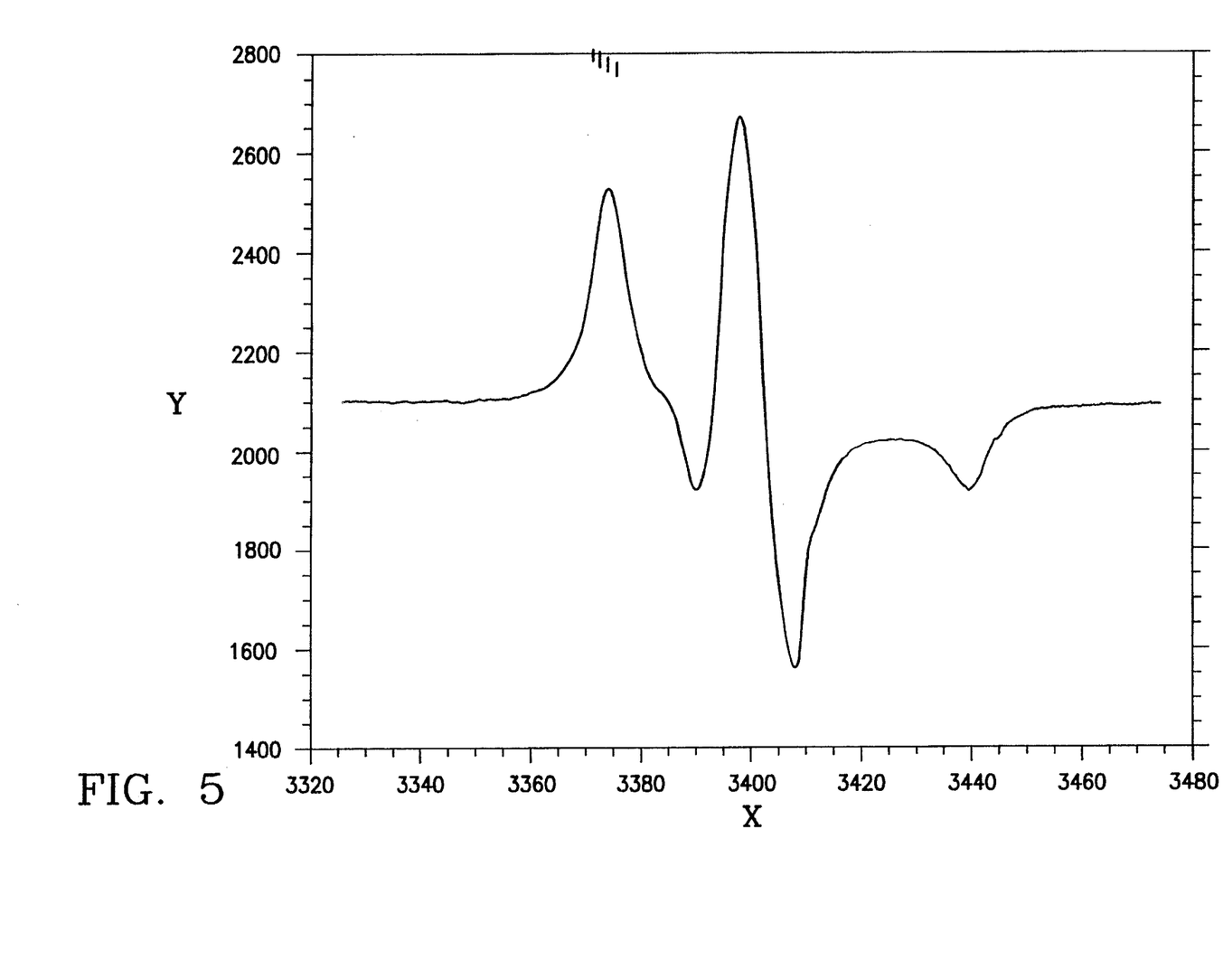

Poly(glycolide-L-lactide) copolymer (50:50 glycolic acid:L-lactic acid monomer ratio), 0.5 g, having an inherent viscosity of about 0.8 as determined at 25° C. by a standard viscometric method, from Boehringer (Ingelheim, Germany), was dissolved in 50 ml distilled tetrahydrofuran at 45° C. Then N,N'-carbonyl diimidazole (0.8 mg) was added. After 20 minutes, 4-amino-2,2,6,6-tetramethylpiperidine-1-oxy (8.5 mg) was added. The reaction mixture was then stirred for 3 hours while maintaining a temperature of 48° C. and reflux condenser purging with dry nitrogen gas. The resulting solution was poured into 800 ml of cold (4° C.) methanol to precipitate poly(glycolide-L-lactide) copolymer (50:50 glycolic acid:L-lactic acid monomer ratio) moiety (i.e., without chain terminating carboxyl) linked by an amide linkage to the 4-position of 2,2,6,6-tetramethylpiperidine-1-oxy. Impure copolymer product was recovered by filtering and was purified by washing three times with methanol and then vacuum drying overnight. Electron spin resonance spectroscopy analysis results on the product are shown in FIG. 5 and demonstrate obtaining of the named product.

Example VI

Aminoxyl-containing radical modified polyethylene terephthalate is prepared by the procedure of Example I except that polyethylene terephthalate (Dacron®), 0.5 g, is substituted for the polyglycolic acid and the temperature is 150°–160° C. rather than 120°– 130° C.

Example VII

Aminoxyl-containing radical modified polyglycolic acid wherein the chain end is provided by an oxycarbonyl linkage to the aminoxyl-containing radical is prepared by the procedure of Example I except that succinimidyl 2,2,5,5-tetramethyl-3-pyrroline-1-oxy-3-carboxylate, (8.5 mg) replaces the amino-2,2,6,6-tetramethylpiperidine-1-oxy and 1,3-dicyclohexyl-carbodiimide (8.1 mg) replaces the N,N'-carbonyl diimidazole.

Variations will be evident to those skilled in the art. For example, the biodegradable polymer and copolymers herein may be used for other drug control/release device applications besides those described. Moreover, the polymers and copolymers herein may be used for surgical implants for reconstruction of injured, diseased and aged human tissues or organs besides the vascular grafts described above, which reduce inflammatory and foreign-body reactions as a result of the aminoxyl-containing radicals neutralizing any harmful free radicals generated, i.e., for more biocompatible surgical implants. Moreover, the polymers and copolymers herein may be used for surgical meshes for hernia and body wall repair, which reduce inflammatory and foreign-body reactions as a result of the aminoxyl-containing radicals neutralizing any harmful free radicals generated, i.e., for more biocompatible surgical meshes. Therefore the scope of the invention is determined by the claims.

What is claimed is:

1. Biocompatible biodegradable polymer or copolymer containing a chain end having a carboxyl group modified to provide a moiety containing an aminoxyl-containing radical in place of the hydroxyl moiety of the carboxyl group except for spin labeled poly-L-glutamates, said polymer or copolymer being formed by replacing a hydroxyl moiety in a carboxyl group at a chain end of a starting material polymer or copolymer containing hydrolyzable ester or nitrogen-phosphorus linkage.

2. The biocompatible polymer or copolymer of claim 1 wherein the moiety containing an aminoxyl-containing radical is provided by an amide or oxycarbonyl linkage to an aminoxyl-containing radical.

3. The biocompatible polymer or copolymer of claim 2 wherein the chain end is provided by an amide linkage to the 4-position of 2,2,6,6-tetramethylpiperidine-1-oxy.

4. The biocompatible polymer or copolymer of claim 3 which is formed by replacing a hydroxyl moiety in a carboxyl group at a chain end of a starting material polymer or copolymer with 4-imino- 2,2,6,6-tetramethylpiperidine-1-oxy.

5. The biocompatible polymer or copolymer of claim 4 wherein the starting material polymer or copolymer is polyglycolic acid.

6. The biocompatible polymer or copolymer of claim 4 wherein the starting material polymer or copolymer is poly-L-lactic acid.

7. The biocompatible polymer or copolymer of claim 4 wherein the starting material polymer or copolymer is poly-DL-lactic acid.

8. The biocompatible polymer or copolymer of claim 4 wherein the starting material polymer or copolymer is poly(glycolide-L-lactide) formed utilizing a monomer mole ratio of glycolic acid to L-lactic acid ranging from 5:95 to 95:5.

9. The biocompatible polymer or copolymer of claim 8 wherein the starting material polymer or copolymer is poly(glycolide-L-lactide) formed using a monomer mole ratio of glycolic acid to L-lactic acid ranging from 45:65 to 95:5.

10. The biocompatible polymer or copolymer of claim 8 wherein the starting material polymer or copolymer is poly(glycolide-L-lactide) formed using a monomer mole ratio of glycolic acid to L-lactic acid of 90:10.

11. The biocompatible polymer or copolymer of claim 8 wherein the starting material polymer or copolymer is poly(glycolide-L-lactide) formed using a monomer mole ratio of glycolic acid to L-lactic acid of 50:50.

12. Polyalkylene terephthalate wherein the alkylene contains 2 to 4 carbon atoms, having a carboxyl group in its chain end modified to provide a moiety containing an aminoxyl-containing radical in place of the hydroxyl moiety of the carboxyl group.

13. The polyalkylene terephthalate of claim 12 which is polyethylene terephthalate having carboxyl group in its chain end modified so as to replace hydroxyl moeity in said carboxyl group with 4-imino-2,2,6,6-tetramethylpiperidine-1-oxy.

14. The biocompatible biodegradable polymer or copolymer of claim 1 wherein the starting material polymer or copolymer is selected from the group consisting of biodegradable linear aliphatic homopolymer polyesters, biodegradable linear aliphatic copolymer polyesters, biodegradable copolymers formed from monomer which polymerizes to form linear aliphatic polyester and other monomer copolymerizable therewith, poly [bis(carboxylatophenoxy)phosphazene], polyanhydrides, polycyanoacrylates, and poly-p-dioxanone.

15. The biocompatible biodegradable polymer or copolymer of claim 1 wherein the aminoxyl-containing radical is selected from the group consisting of 2,2,6,6-tetramethylpiperidine-1-oxy, 2,2,5,5-tetramethylpyrrolidine-1-oxy and 2,2,5,5-tetramethyl-3-pyrroline-1-oxy-3-carbonyl.

16. The biocompatible biodegradable polymer or copolymer of claim 1 wherein the starting material polymer or copolymer is selected from the group consisting of biodegradable linear aliphatic homopolymer polyesters and biodegradable linear aliphatic copolymer polyesters and the aminoxyl-containing radical is selected from the group consisting of 2,2,6,6-tetramethylpiperidine-1-oxy, 2,2,5,5-tetramethylpyrrolidine-1-oxy and 2,2,5,5-tetramethyl-3-pyrroline-1-oxy-3-carbonyl.

\* \* \* \* \*